US011975433B2

(12) United States Patent
Okouchi

(10) Patent No.: US 11,975,433 B2
(45) Date of Patent: May 7, 2024

(54) DRIVING TOOL

(71) Applicant: MAKITA CORPORATION, Anjo (JP)

(72) Inventor: Yukiyasu Okouchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 517 days.

(21) Appl. No.: 17/290,072

(22) PCT Filed: Nov. 12, 2019

(86) PCT No.: PCT/JP2019/044423
§ 371 (c)(1),
(2) Date: Apr. 29, 2021

(87) PCT Pub. No.: WO2020/116103
PCT Pub. Date: Jun. 11, 2020

(65) Prior Publication Data

US 2021/0394346 A1 Dec. 23, 2021

(30) Foreign Application Priority Data

Dec. 4, 2018 (JP) ................................ 2018-227341

(51) Int. Cl.
*B25C 1/06* (2006.01)

(52) U.S. Cl.
CPC ..................................... *B25C 1/06* (2013.01)

(58) Field of Classification Search
CPC .................................... B25C 1/06; B25F 5/00
(Continued)

(56) References Cited

U.S. PATENT DOCUMENTS 4,928,868 A * 5/1990 Kerrigan .................. B25C 1/06 173/13
7,686,199 B2 * 3/2010 Gross ........................ B25C 1/06 227/9

(Continued)

FOREIGN PATENT DOCUMENTS

JP 2008-229729 A 10/2008
JP 2018-140480 A 9/2018

OTHER PUBLICATIONS

Feb. 10, 2020 Search Report issued in International Patent Application No. PCT/JP2019/044423.

*Primary Examiner* — Valentin Neacsu
(74) *Attorney, Agent, or Firm* — Oliff PLC

(57) ABSTRACT

A driving tool includes a driver configured to linearly move forward along a driving line to thereby strike and drive a fastener into a workpiece. The driver includes a striking member, a support member, and an engagement member engaged with the striking member and the support member and configured to restrict movement of the striking member relative to the support member in a front-rear direction. The support member includes a support surface supporting a portion of the striking member, at least one receiving surface configured to receive a reaction force to the striking member caused by driving of the fastener, and restricting parts spaced apart from each other in the front-rear direction, located at an opposite side of the striking member from the support surface in a crossing direction crossing the support surface, and configured to restrict movement of the striking member in a direction away from the support surface.

15 Claims, 12 Drawing Sheets

(58) Field of Classification Search
USPC .................................................. 227/140, 120
See application file for complete search history.

(56) References Cited

U.S. PATENT DOCUMENTS

| | | | | |
|---|---|---|---|---|
| 8,123,099 | B2 * | 2/2012 | Kenney | B25C 1/06 227/120 |
| 8,511,532 | B2 * | 8/2013 | Chien | B25C 1/06 227/120 |
| 10,022,848 | B2 * | 7/2018 | Gross | B25F 5/00 |
| 10,766,128 | B2 * | 9/2020 | Gross | B25C 1/06 |
| 2005/0217416 | A1 * | 10/2005 | Berry | B25C 1/06 29/527.3 |
| 2005/0218181 | A1 * | 10/2005 | Gross | B25C 1/06 173/210 |
| 2005/0224552 | A1 * | 10/2005 | Berry | B25C 1/06 227/131 |
| 2011/0259937 | A1 * | 10/2011 | Chien | B25C 1/06 227/120 |
| 2016/0023341 | A1 * | 1/2016 | Gross | B25C 1/06 173/117 |
| 2017/0066116 | A1 * | 3/2017 | Garber | B25C 1/06 |
| 2018/0200873 | A1 * | 7/2018 | Chien | B25C 1/06 |
| 2018/0290280 | A1 * | 10/2018 | Gross | B25F 5/00 |
| 2021/0394346 | A1 * | 12/2021 | Okouchi | B25C 1/06 |

* cited by examiner

DRIVING TOOL

TECHNICAL FIELD

The present invention relates to a driving tool that drives a fastener into a workpiece, using a driver that moves linearly.

BACKGROUND

A driving tool is known that drives a fastener such as a nail into a workpiece by linearly moving a driver in its longitudinal direction to strike the fastener. One end portion of the driver in its longitudinal direction is configured as a striking part that strikes the fastener and has a relatively smaller width in accordance with the diameter of the fastener to be used. On the other hand, the remaining portion of the driver other than the striking part generally has a certain width, in order to secure its strength, for example. For example, Japanese Unexamined Patent Application Publication No. 2018-140480 discloses a driver that includes a main body and a striking part having a smaller width than the main body.

SUMMARY

Technical Problem

It is reasonable to form the driver such that the main body and the striking part are integrally formed by means of casting or the like. However, it might be difficult to integrally form the main body and the striking part by means of casting or the like, depending on the width of the striking part.

An object of the present invention is, in consideration of the circumstances described above, to provide a driving tool having a driver with a structure that can be easily manufactured, regardless of a width of its end portion that strikes a fastener.

Solution to Problem

One aspect of the present invention provides a driving tool that includes a driver. The driver is configured to linearly move forward along a driving line that defines a front-rear direction of the driving tool to thereby strike and drive a fastener into a workpiece. The driver includes a striking member, a support member, and an engagement member. The striking member is formed as an elongate member extending in the front-rear direction. The striking member has a front end portion, which is configured to strike the fastener, and a rear end portion. The support member is configured to support the striking member. The engagement member is engaged with the striking member and the support member, and configured to restrict movement of the striking member relative to the support member in the front-rear direction. The support member includes a support surface, at least one receiving surface, and restricting parts. The support surface is configured to support a portion of the striking member. The at least one receiving surface is configured to receive a reaction force to the striking member caused by driving of the fastener. The restricting parts are spaced apart from each other in the front-rear direction. Further, the restricting parts are located at an opposite side of the striking member from the support surface in a crossing direction crossing the support surface, and configured to restrict movement of the striking member in a direction away from the support surface.

The driver in this aspect is not formed by one single piece member but include the striking member that strikes the fastener, the support member that supports the striking member, and the engagement member that engages with these members to thereby restrict relative movement of these members in the front-rear direction. With such a structure, each of the support member and the striking member can be formed independently of the other by a suitable material and/or a suitable method. Further, the driver can be easily assembled by merely arranging the striking member between the support surface of the support member and the restricting parts in the crossing direction and engaging the engagement member with the striking member and the support member and thereby restricting the relative movement of the striking member and the support member in the front-rear direction. In this manner, according to this aspect, the driver is obtained that has a structure that can be easily manufactured, regardless of a width of an end portion that strikes the fastener. When the driver in this aspect drives the fastener, a rearward reaction force is applied to the striking member, and the receiving surface of the support member receives the reaction force. Further, even when the striking member tries to move in the direction away from the support surface due to the impact upon the driving of the fastener, the restricting parts can restrict such movement. Thus, even though the driver is formed by the discrete striking and support members that are coupled with each other, the driver can appropriately perform the driving of the fastener. The "restricting" of the movement in this aspect means not only completely preventing movement but also allowing slight movement but preventing movement exceeding a predetermined amount.

In this aspect, the support surface of the support member may be formed as, for example, a surface that extends in the front-rear direction along the driving line (a longitudinal axis of the driver) (namely, a surface that does not cross the driving line). It is preferable that the support surface supports the striking member in plane (surface) contact with a portion of the striking member. The receiving surface may be typically formed as a surface that extends in a direction crossing the driving line and that is contactable with the striking member. Examples of a manner of engagement between the engagement member and the striking member and between the engagement member and the support member may include a manner in which the engagement member is fixed to one of the striking member and the support member, while the engagement member is engaged with the other one of the striking member and the support member in a state in which the engagement member is slightly movable relative to (typically, loosely engaged with) the other one, and a manner in which the engagement member is engaged with the striking member and the supporting member in a state in which the engagement member is slightly movable relative to both of the striking member and the support member. It may be preferable that the engagement member extends in a direction crossing the support surface and is engaged with the striking member and the support member, and it may be more preferable that the engagement member extends in a direction orthogonal to the support surface and is engaged with the striking member and the support member.

In one aspect of the present invention, one of the restricting parts may be disposed at a position where one of the restricting parts faces the rear end portion of the striking member in the crossing direction. According to this aspect, a portion in the striking member that is located farthest from the front end portion, which strikes the fastener, can be reliably restricted to move in the direction away from the support surface.

In one aspect of the present invention, the at least one receiving surface of the support part may be configured to contact a rear end surface of the striking member. According to this aspect, structures of the rear end portion of the striking member, the receiving surface of the support member and adjacent portions thereof can be simplified, and thereby the manufacturing cost can be suppressed. The rear end surface may be typically formed as a flat surface that is orthogonal to the driving line (the longitudinal axis of the driver).

In one aspect of the present invention, the striking member may have a pair of inclined surfaces that are inclined (oblique) to be closer to each other toward a rear. The at least one receiving surface may include a pair of inclined surfaces configured to contact the pair of inclined surfaces of the striking member. According to this aspect, relatively large areas of the striking member and the receiving surface can be secured where the striking member and the receiving surface contact with each other, so that the surface pressure of the receiving surface can be reduced. Consequently, the durability of the driver can be favorably maintained. It may be preferable that each pair of the inclined surfaces of the striking member and the inclined surfaces (receiving surfaces) of the support member is arranged in symmetry relative to the driving line (the longitudinal axis of the driver).

In one aspect of the present invention, the engagement member may be located between the restricting parts in the front-rear direction. According to this aspect, the movement of the striking member relative to the support member in the front-rear direction and in the direction away from the support surface can be stably restricted.

In one aspect of the present invention, one of the striking member and the support member may have a hole. The engagement member may be fixed to the other one of the striking member and the support member, and a portion of the engagement member may be disposed in the hole in a state in which a clearance is provided in the front-rear direction of the engagement member. According to this aspect, the impact transmitted to the engagement member upon driving the fastener can be reduced. Thus, the engagement member having a simple structure (for example, a simple pin or a screw) can restrict the relative movement of the striking member and the support member in the front-rear direction.

In one aspect of the present invention, the engagement member may be removably fixed to at least one of the striking member and the support member. In the driver, the striking member (a front end portion) that strikes the fastener may be more easily worn or deformed, compared to the other portions. According to this aspect, coupling between the striking member and the support member can be cancelled by removing the engagement member, so that the striking member can be replaced.

In one aspect of the present invention, the engagement member may be configured to extend in the crossing direction and to engage with the support member and the striking member.

In one aspect of the present invention, the engagement member may be a screw or a pin.

In one aspect of the present invention, the driving tool may further include a motor, and a flywheel that is configured to be rotationally driven by the motor. The driver may be configured to move forward in response to receiving rotational energy of the flywheel. The support member may be a portion that is configured to receive the rotational energy. According to this aspect, each of the striking member and the support member, which have different functions, can be formed independently of the other by a suitable material and/or a suitable method. The support member may be configured to receive the rotational energy directly from the flywheel or may be formed to receive the rotational energy indirectly (for example, via a transmission member) from the flywheel.

DESCRIPTION OF EMBODIMENTS

Embodiments of the present invention are described below with reference to the drawings.

First Embodiment

A nailer 1 according to a first embodiment of the present invention is described with reference to FIG. 1 through FIG. 7. The nailer 1 is an example of a driving tool that is capable of driving a nail 101, which is an example of a fastener, into a workpiece 100 (for example, wood).

Figure 1:
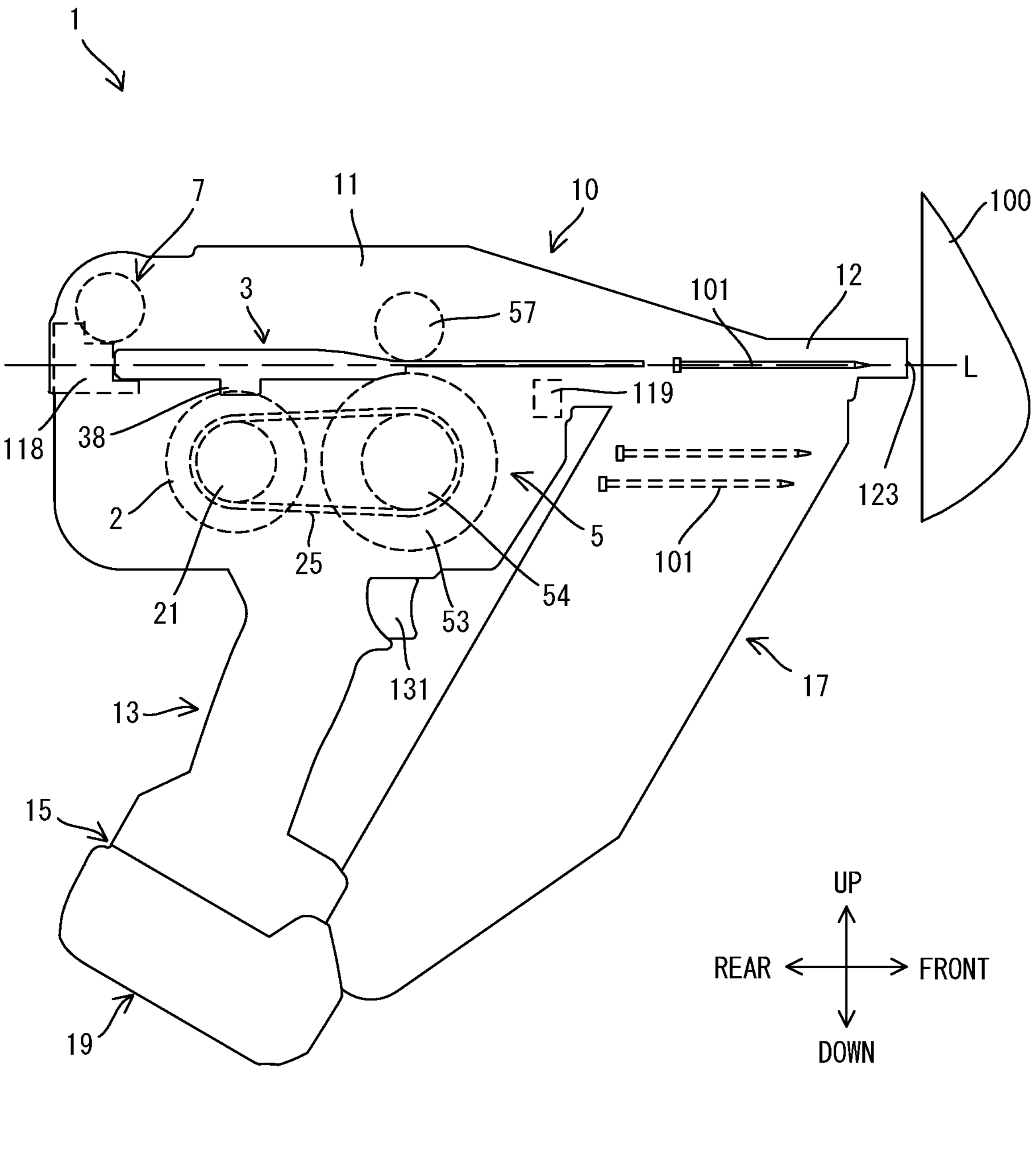
FIG. 1 is a view for schematically explaining an overall structure of a nailer when a driver is located at an initial position.

Firstly, the general structure of the nailer 1 is described. As shown in FIG. 1, an outer shell of the nailer 1 is mainly formed by a tool body 10, a handle 13, and a magazine 17.

The tool body 10 includes a main housing 11 and a nose part 12. The tool body 10 houses a motor 2, a driver 3, a driver-driving mechanism 5, and a return mechanism 7. The driver 3 is configured to linearly move along a predetermined driving line L to thereby strike and eject the nail 101 from the nailer 1. The driver-driving mechanism 5 is configured to move the driver 3 in a direction in which the driver 3 ejects the nail 101, using power of the motor 2 serving as a driving source. The return mechanism 7 is configured to return the driver 3, which has ejected the nail 101, back to an initial position. The details of the driver 3, the driver-driving mechanism 5, and the return mechanism 7 will be described below. The nose part 12 is coupled to one end of the main housing 11 in an extending direction of the driving line L (hereinafter simply referred to as a driving-line-L direction). The nose part 12 has a driver passage (not shown)

that extends through the nose part 12 in the driving-line-L direction. The nose part 12 has an ejection port 123 from which the nail 101 is ejected, at its end opposite to the main housing 11.

The handle 13 protrudes from a center portion of the main housing 11 in the driving-line-L direction, and extends in a direction crossing the driving-line-L direction. The handle 13 is a portion to be held by a user. A trigger 131, which is configured to be manually pulled by a user, is disposed on a proximal (base) end portion of the handle 13 (an end part connected to the main housing 11). A battery-mounting part 15 having terminals etc. is disposed on (in) a distal end portion of the handle 13 (an end portion opposite to the proximal end portion). A rechargeable battery 19 can be removably mounted to the battery-mounting part 15. Although the illustration thereof is omitted, a trigger switch, a controller, and the like are disposed in the handle 13. The trigger switch is normally kept in an OFF state, and is turned into an ON state when the trigger 131 is manually pulled. The controller is configured to control the motor 2 and the driver-driving mechanism 5.

The magazine 17 is loadable with a plurality of the nails 101 and is attached to the nose part 12. The nails 101 loaded in the magazine 17 are fed one by one into the driver passage by a nail feeding mechanism (not shown).

The detailed structure of the nailer 1 is described below. In the following description, the driving-line-L direction (a left-right direction in FIG. 1) is defined as a front-rear direction of the nailer 1, for convenience of explanation. In the front-rear direction, a side at which the ejection port 123 is located (a right side in FIG. 1) is defined as a front side of the nailer 1, and the opposite side thereof (a left side in FIG. 1) is defined as a rear side. A direction that is orthogonal to the driving line L and corresponds to an extending direction of the handle 13 (an up-down direction in FIG. 1) is defined as an up-down direction of the nailer 1. In the up-down direction, a side at which the proximal end portion of the handle 13 is located (an upper side in FIG. 1) is defined as an upper side, and a side at which the distal end of the handle 13 is located (a lower side in FIG. 1) is defined as a lower side. A direction that is orthogonal to both of the front-rear direction and the up-down direction is defined as a left-right direction.

Firstly, the motor 2, which serves as the driving source of the driver 3, is described. As shown in FIG. 1, the motor 2 is disposed such that a rotational axis of an output shaft (not shown) that is rotated together with a rotor extends in the left-right direction, orthogonally to the driving line L. In the present embodiment, a brushless DC motor is adopted as the motor 2. A pulley 2 that is integrally rotated with the output shaft is coupled to the output shaft of the motor 2.

Next, the driver 3 is briefly described. As shown in FIG. 1, the driver 3 has an elongate shape and is disposed such that its longitudinal axis is located on the driving line L. The driver 3 is held to be linearly movable between the initial position and a driving position along the driving line L (in other words, in the front-rear direction of the nailer 1, or in the longitudinal direction of the driver 3).

Figure 2:
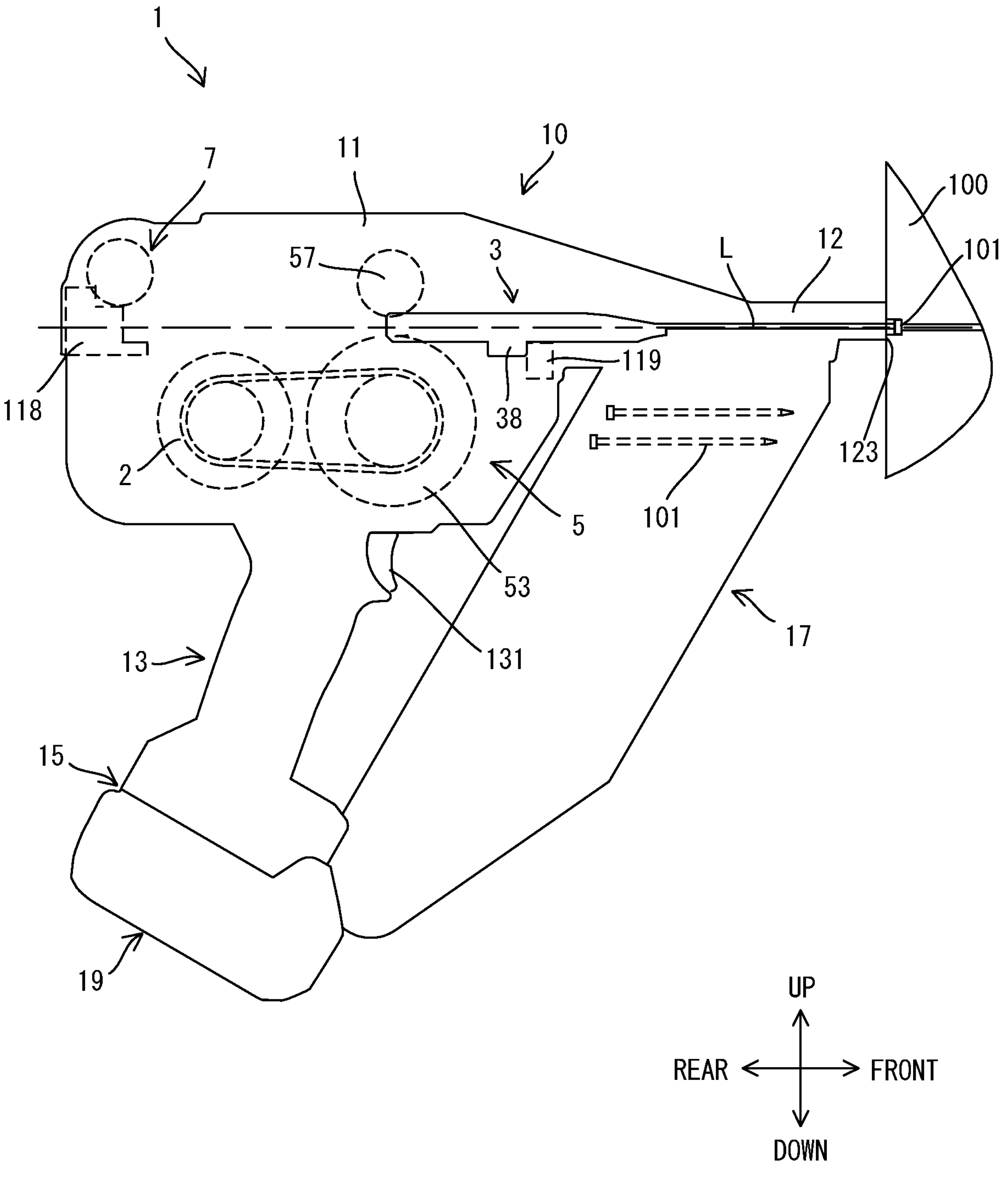
FIG. 2 is a view for schematically explaining the overall structure of the nailer when the driver is located at a driving position.

FIG. 1 shows a state in which the driver 3 is located at the initial position. The initial position denotes a position where the driver 3 is held in a state in which the driver-driving mechanism 3 is not activated (hereinafter referred to as an initial state). In the present embodiment, the initial position of the driver 3 is set to a position where a rear end of the driver 3 (specifically, a rear end of a main body 32 (see FIG. 3) described below) contacts a rear stopper 118. The rear stopper 118 is disposed in a rear end portion of the main housing 11. FIG. 2 shows a state in which the driver 3 is located at the driving position. The driving position denotes a position where the driver 3, which has been moved forward by the driver-driving mechanism 3, drives the nail 101 into the workpiece 100 after striking the nail 101. In the present embodiment, the driving position of the driver 3 is set to a position where a front end of the driver 3 (specifically, a front end of a blade 31 (see FIG. 3) described below) slightly protrudes from the ejection port 123. The driving position of the driver 3 is also a position where front ends of a pair of arms 38 described below contact a pair of front stoppers 119 from the rear. The front stoppers 119 are fixed to an inside of a front end portion of the main housing 11. Due to the arrangement described above, in the present embodiment, the initial position and the driving position may be also referred to as a rearmost position and a frontmost position within a movable range of the driver 3, respectively. The rear stopper 118 and the front stoppers 119 are formed by cushioning materials in order to reduce the impact upon collision of the driver 3.

The driver-driving mechanism 5 is now described. As shown in FIG. 1, the driver-driving mechanism 5 in the present embodiment includes a flywheel 53 and a pressing roller(s) 57. The driver-driving mechanism 5 having such a configuration is known, and therefore it is only briefly described here.

The flywheel 53 has a circular cylindrical shape and is rotatably supported in front of of the motor 2. A rotational axis of the flywheel 53 extends in the left-right direction, which is parallel to the rotational axis of the motor 2 and orthogonal to the driving line L of the driver 3. A pulley 54, which is integrally rotated with the flywheel 53, is coupled to a support shaft (not shown) of the flywheel 53. A belt 25 is looped over the pulley 21 of the motor 2 and the pulley 54 of the flywheel 53. The rotation of the motor 2 is transmitted to the flywheel 53 via the pulleys 21 and 54 and the belt 25, so that the flywheel 53 is rotated in a clockwise direction in FIG. 1.

Although not shown in detail, in the present embodiment, a contact arm is held on the front end portion of the nose part 12 so as to be movable in the front-rear direction. When the contact arm is pressed against the workpiece 100 and moved rearward, a switch disposed in the main housing 11 is pressed and turned ON, so that the controller drives the motor 2. Thus, the flywheel 53 is rotated.

The pressing roller 57 is configured to move the driver 3 forward in cooperation with the flywheel 53. The pressing roller 57 is rotatably supported above the flywheel 53. A rotational axis of the pressing roller 57 extends in the left-right direction, parallel to the rotational axis of the flywheel 53. Although not shown in detail, in the present embodiment, the pressing roller 57 is configured to be movable between a pressing position, at which the pressing roller 57 contacts the driver 3 from above and presses the driver 3 against the flywheel 53, and a spaced-apart position, at which the pressing roller 57 is spaced apart from the driver 3. More specifically, the pressing roller 57 is normally held in the spaced-apart position, and is moved from the spaced-apart position to the pressing position when the trigger 131 is manually pulled and the trigger switch (not shown) is turned ON while the motor 2 is driven. At this time, if the flywheel 53 is being rotated in the clockwise direction in FIG. 1, the driver 3 frictionally engages with the flywheel 53 to receive rotational energy of the flywheel 53, and thereby moves forward.

The return mechanism 7 is now described. As shown in FIG. 1, the return mechanism 7 in the present embodiment is disposed in the rear end portion of the main housing 11. Although not shown in detail, the return mechanism 7 includes a torsion coil spring, a winding drum, and a pair of wires. The winding drum holds the torsion coil spring, and is rotatably supported by the main housing 11. One ends of the wires are connected to the winding drum, and the other ends thereof are connected to the arms 38 of the driver 3. In the initial state, the driver 3 is biased rearward by an elastic force of the torsion coil spring via the wires wound on the winding drum, so that the driver 3 is held at the initial position. On the other hand, when the driver 3 moves forward in response to receiving the rotational energy of the flywheel 53, the wires are drawn from the winding drum to thereby increase the elastic force of the torsion coil spring. When the driver 3 reaches the driving position, the frictional engagement between the driver 3 and the flywheel 53 is cancelled. The driver 3 is pulled rearward while the wires are wound around the winding drum by the elastic force of the torsion coil spring, and thereby the driver 3 is returned to the initial position.

The detailed structure of the driver 3 in the present embodiment is now described.

Figure 3:
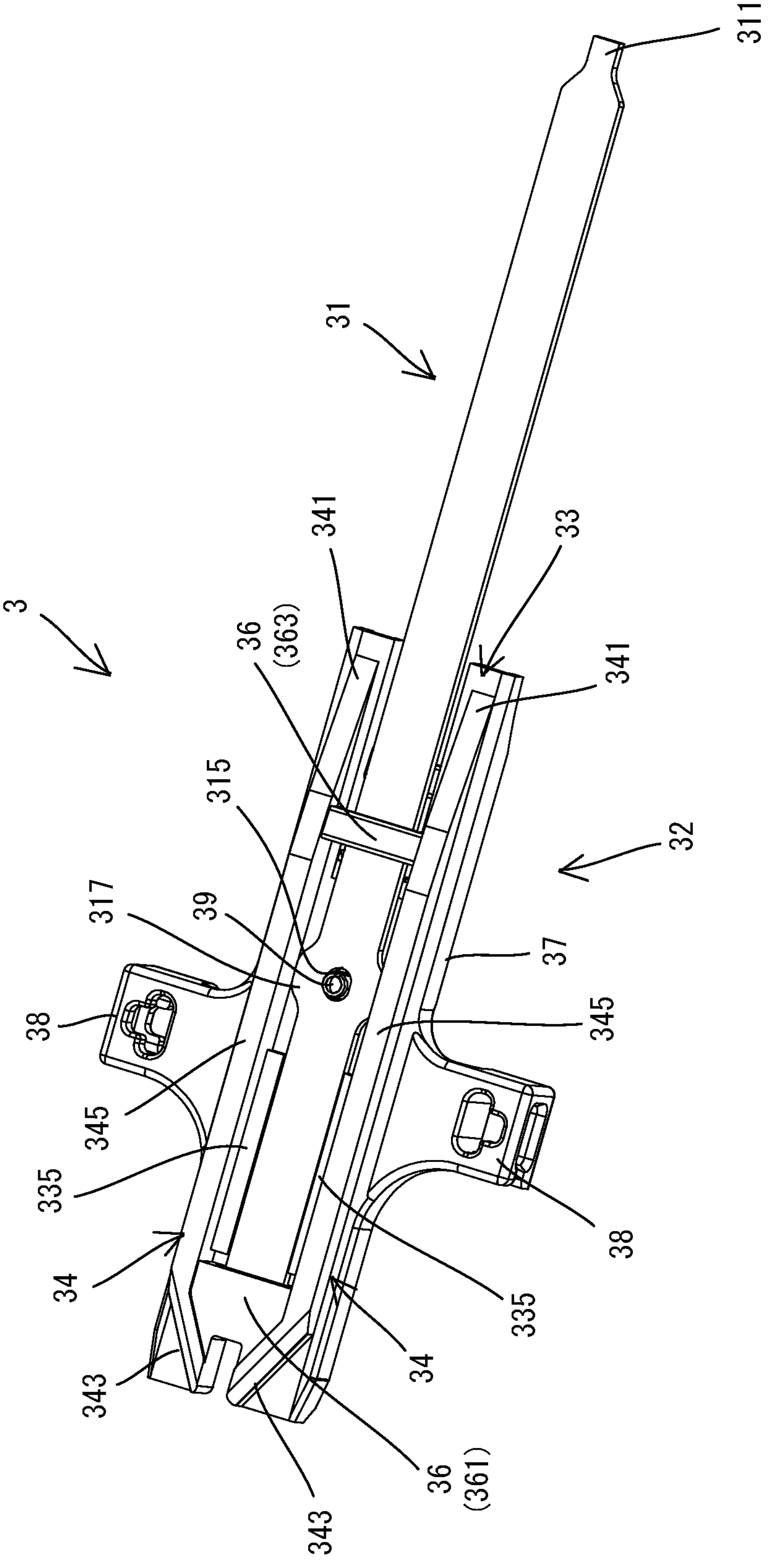
FIG. 3 is a perspective view of the driver.
Figure 4:
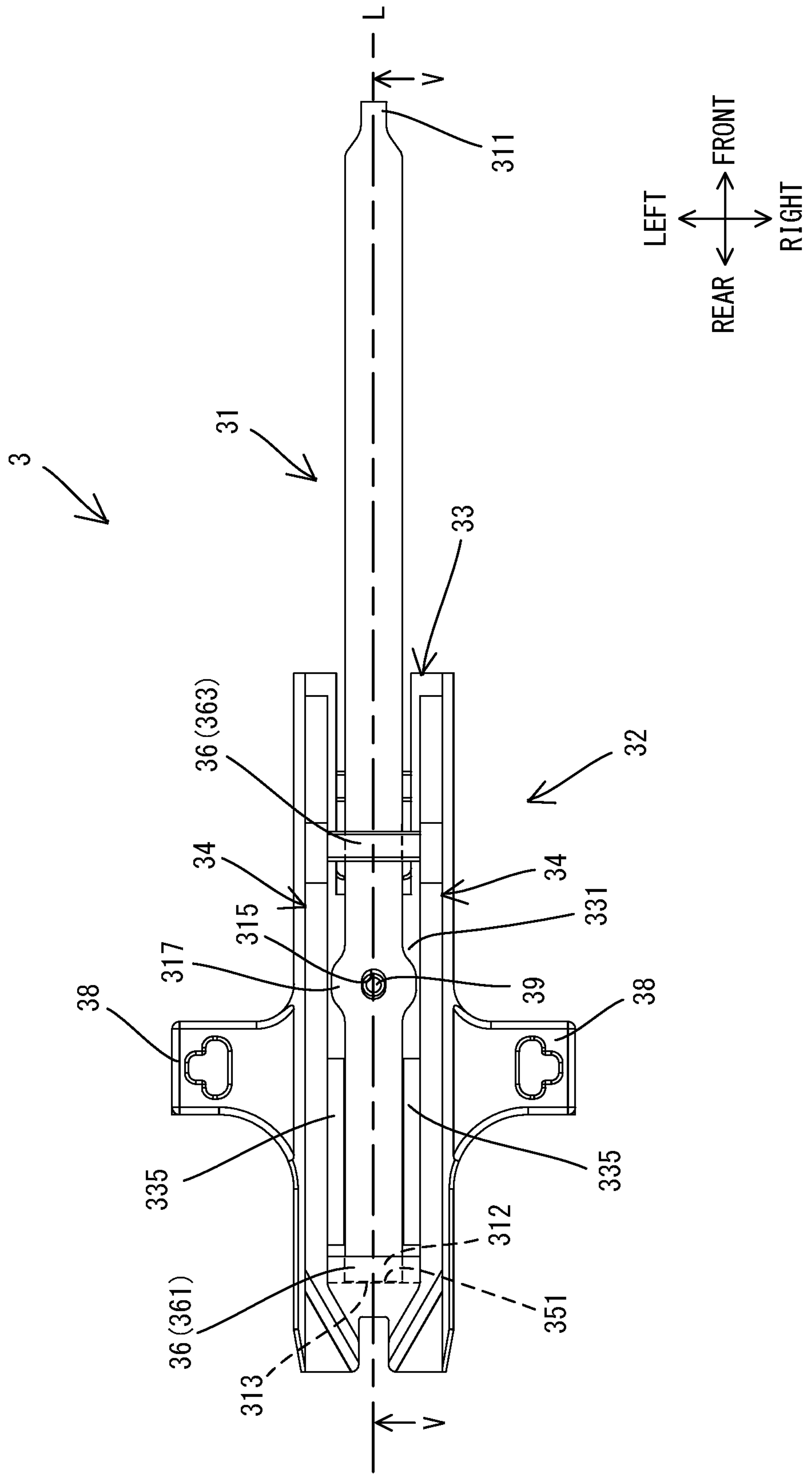
FIG. 4 is a plan view of the driver.
Figure 5:
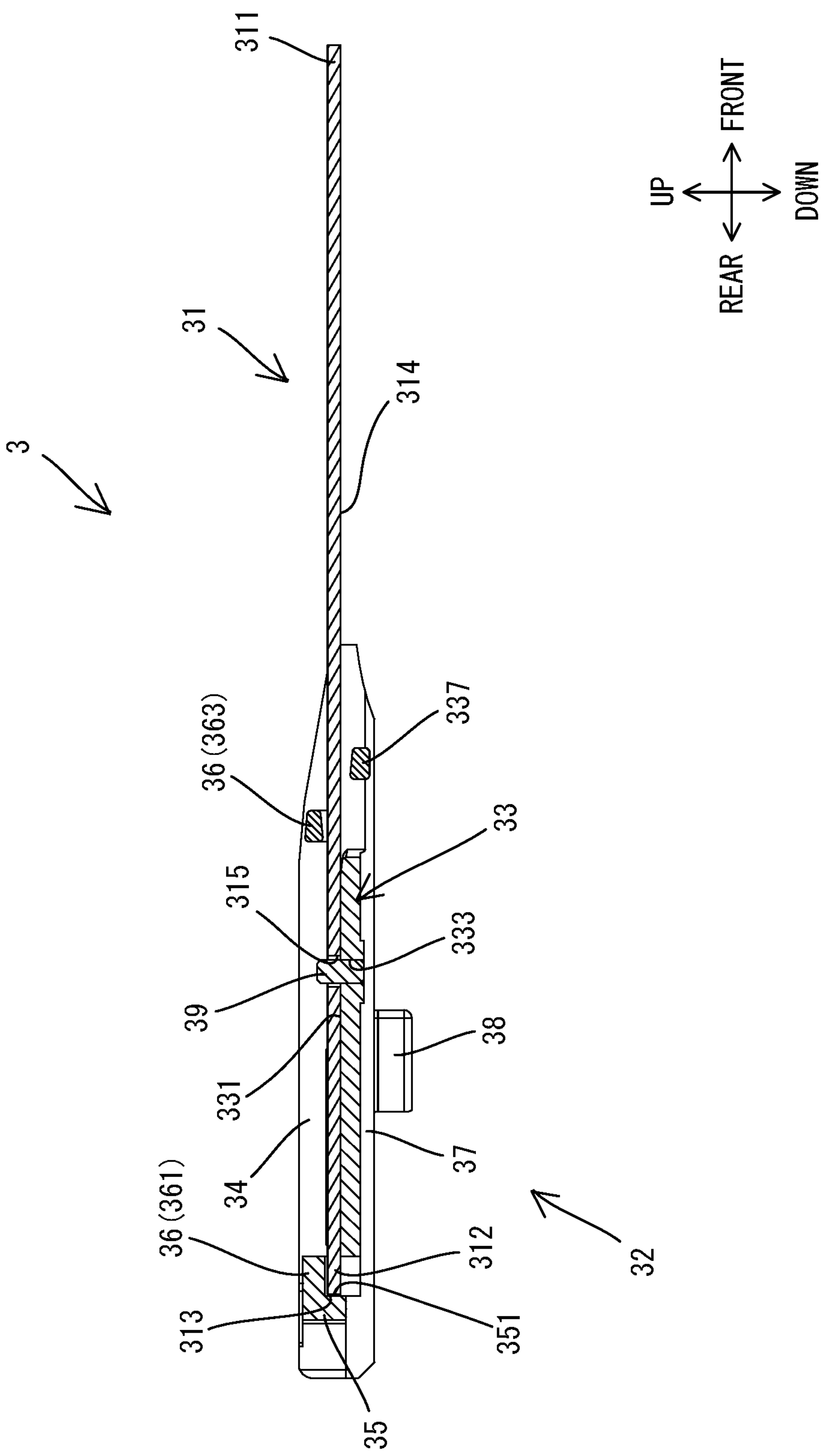
FIG. 5 is a cross-sectional view taken along line V-V in FIG. 4.

As shown in FIG. 3 through FIG. 5, the driver 3 as a whole is formed in a left-right symmetry with respect to its longitudinal axis. Further, the driver 3 is formed by coupling several components (parts) that have been separately (discretely) formed. More specifically, the driver 3 includes the blade 31, the main body 32, and a press-fit pin 39. The structures of these components (parts) are described in turn.

As shown in FIG. 3 through FIG. 5, the blade 31 is an elongate member extending linearly in the front-rear direction (in the longitudinal direction of the driver 3), and is configured to strike the nail 101. The blade 31 as a whole is formed as a generally rectangular thin plate metal member. In the present embodiment, the blade 31 is formed by means of press working process. The most part of the blade 31 has a uniform width (length in the left-right direction), but a front end portion 311 has a smaller width than the other part, for the purpose of striking the nail 101. An engagement hole 315, which extends through the blade 31 in the up-down direction, is formed between a center portion in the front-rear direction of the blade 31 and a rear end portion 312 of the blade 31. The engagement hole 315 is an elongate hole that is longer in the front-rear direction than in the left-right direction. A length in the front-rear direction (a maximum diameter) of the engagement hole 315 is larger than a diameter of the press-fit pin 39 (see FIG. 4), and a width in the left-right direction (a minimum diameter) is generally the same as the diameter of the press-fit pin 39. A portion surrounding (adjacent to) the engagement hole 315 has a larger width than the other part. This portion is hereinafter referred to as a wider part 317. The width of the wider part 317 is set to be slightly smaller than an interval between a pair of roller contact parts 34, which will be described below.

Figure 6:
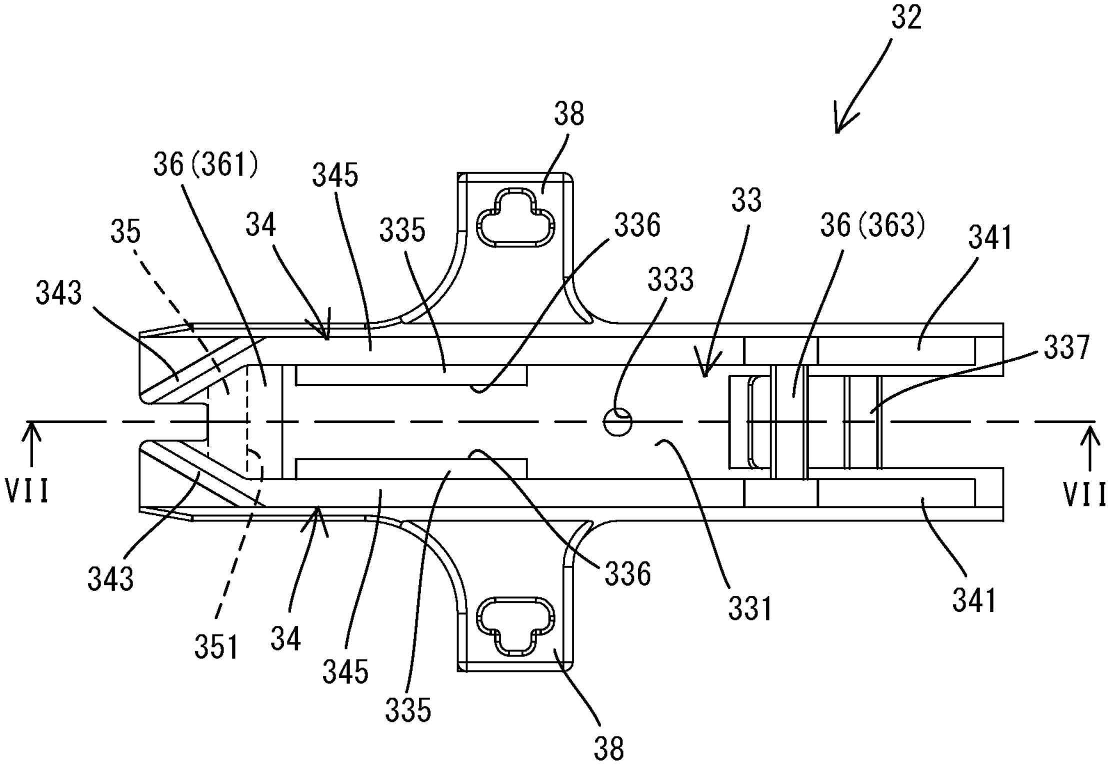
FIG. 6 is a plan view of a main body.
Figure 7:
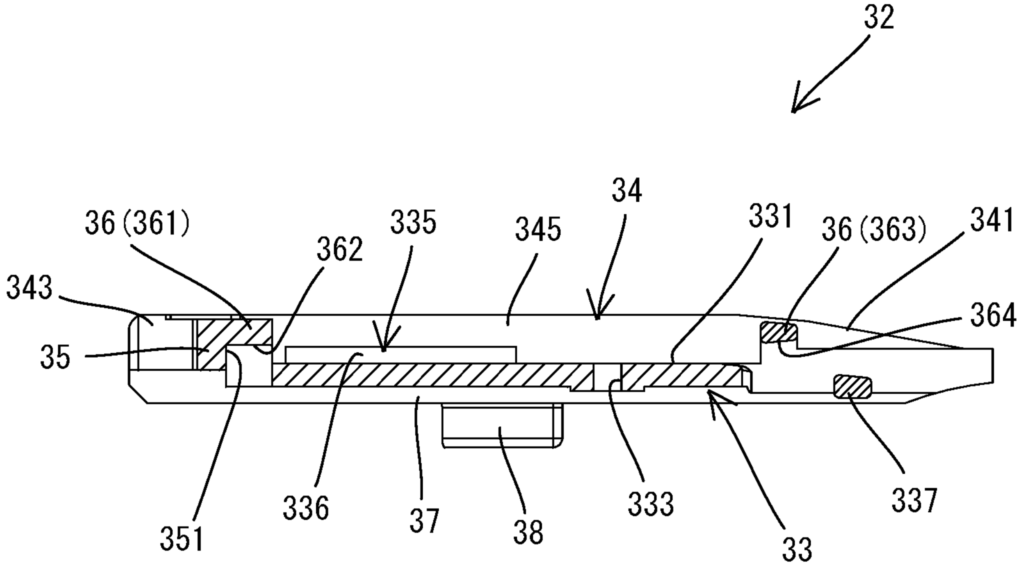
FIG. 7 is a cross-sectional view taken along line VII-VII in FIG. 6.

The main body 32 is formed as a support member that supports the blade 31. The main body 32 is also a portion of the driver 3 that receives the rotational energy of the flywheel 53. As shown in FIG. 3, FIG. 6, and FIG. 7, the main body 32 as a whole is formed as an elongate member extending linearly in the front-rear direction. A length in the front-rear direction of the main body 32 is generally half of a length of the blade 31. The main body 32 includes a support part 33, the pair of roller contact parts 34, a receiving part 35, two restricting parts 36, a pair of frictional engagement parts 37, and the pair of arms 38. In the present embodiment, all of these parts are integrally formed, and therefore the main body 32 is a single metal member. In the present embodiment, the main body 32 is formed by means of a lost-wax casting process.

The support part 33 is a plate-like portion that is configured to support the blade 31 (specifically, a rear portion of the blade 31). When seen from above, the support part 33 has a rectangular shape that is elongate in the front-rear direction and that has a rectangular cut in its front central portion. An upper surface of the support part 33 is configured as a support surface 331 that is in plane (surface) contact with a lower surface 314 (see FIG. 5) of the blade 31 to support the blade 31. In the present embodiment, the lower surface 314 of the blade 31 and the support surface 331 are both flat surfaces that extend in the front-rear direction to be generally parallel to the longitudinal axis of the driver 3 (the driving line L). A press-fit hole 333, which extends through the support part 33 in the up-down direction, is formed in the support part 33. The press-fit hole 333 is located at a slightly frontward of the center portion of the support part 33.

The support part 33 is provided with a pair of restricting parts 335 protruding upward from the support surface 331. The restricting part 335 is configured to restrict movement of the blade 31 relative to the main body 32 in the left-right direction. Each of the restricting parts 335 has a parallelepiped shape that is elongate in the front-rear direction. The restricting parts 335 are disposed at positions spaced away from a center line in the left-right direction of the main body 32 (the longitudinal axis of the driver 3) by equal distances. Opposing surfaces of the restricting parts 335 extend in the up-down direction to be parallel to the longitudinal axis of the driver 3. A distance between the opposing surfaces is set to be slightly larger than the width of the blade 31. The opposing surfaces of the restricting parts 335 serve as restricting surfaces 336 that restrict movement of the blade 31 in the left-right direction by contacting left and right side surfaces of the blade 31.

The roller contact parts 34 are portions that contact the pressing roller(s) 57 (see FIG. 1) and receive the pressing force. The roller contact parts 34 protrude upward from the support surface 331 (the upper surface of the support part 33), and extend generally in the front-rear direction along left and right end portions of the support part 33, respectively. A front end portion of the roller contact part 34 is formed as an inclined part 341 whose height (a thickness in the up-down direction between the support surface 331 and a protruding end surface (an upper surface)) gradually increases toward its rear. The inclined part 341 serves as a cam part that is pressed by the pressing roller 57 to press the driver 3 (the frictional engagement parts 37) against the flywheel 53 so as to cause the frictional engagement, at an earlier stage of a driving process. Rear end portions of the roller contact parts 34 are formed in a V-shape of which an apex is located at the rear when seen from above. The rear end portions are formed as inclined parts 343 that are inclined away from each other toward their lower side. The inclined part 343 serves as a cam part that relaxes the pressing of the pressing roller 57 to the driver 3 so as to cancel the frictional engagement between the driver 3 and the flywheel 53, at a final stage of the driving process. An intermediate part 345 between the inclines part 341 and the inclined part 343 in the roller contact part 34 has a uniform height.

The restricting parts 335 of the support part 33 are disposed adjacent to an inner side (a side of the longitudinal axis of the driver 3) of the roller contact parts 34 (specifically, a rear portion of the intermediate part 345). A height of the restricting part 335 is slightly larger than a height (thickness) of the blade 31 and slightly smaller than a height of the roller contact part 34. Thus, the height of the restricting parts 335 is set such that the restricting parts 335 do not come into contact with the pressing roller(s) 57.

As shown in FIG. 6 and FIG. 7, the receiving part 35 is a wall portion that is provided in the rear end portion of the main body 32. More specifically, the receiving part 35 is provided to connect the rear end portions (the inclined parts 343) of the roller contact parts 34 to each other. In the present embodiment, the receiving part 35 is located rearward of the rear end of the support surface 331. The receiving part 35 is a portion that receives the reaction force that is caused by striking the nail 101 and applied to the blade 31. A front surface of the receiving part 35 extends in the up-down direction to cross (substantially orthogonally cross) the driving line L (the longitudinal axis of the driver 3). The front surface of the receiving part 35 serves as a receiving surface 351 that contacts the rear end surface 313 of the blade 31 (see FIG. 5) and receives the reaction force.

Each of the two restricting parts 36 is a portion that is configured to restrict movement of the blade 31 in a direction away from the support surface 331 (namely, in the upward direction). The two restricting parts 36 are spaced away from each other in the front-rear direction. Further, each of the restricting parts 36 is disposed at an opposite side (namely, at the upper side) of the blade 31, which is supported by the support surface 331, from the support surface 331 in the up-down direction. One of the restricting parts 36 that is located at the rear side is hereinafter referred to as a rear restricting part 361, and the other of the restricting parts 36 that is located at the front side is hereinafter referred to as a front restricting part 363.

In the present embodiment, the rear restricting part 361 is formed as a top wall portion that is connected to an upper end portion of the receiving part 35 and protrudes forward, in the rear end portion of the main body 32. The rear restricting part 361 is disposed to cover the rear end portion 312 of the blade 31, which is supported by the main body 32, from above (see FIG. 5). In the front-rear direction, a front end of the rear restricting part 361 is generally at the same position as the rear end of the support surface 331, and a space is formed directly below the rear restricting part 361. A distance in the up-down direction between a lower surface of the rear restricting part 361 and the support surface 331 is set to be slightly larger than the thickness of the blade 31. The lower surface of the rear restricting part 361 serves as a restricting surface 362 that contacts the upper surface of the blade 31 and restricts the upward movement of the blade 31.

The front restricting part 363 is formed as a beam-like portion that is disposed in a front portion of the main body 32. More specifically, the front restricting part 363 is provided to connect the front end portions (the inclined parts 341) of the roller contact parts 34 to each other. The front restricting part 363 is located frontward of the front end of the support surface 331, and located directly above the cut (space) formed in the front end portion of the support part 33. The front restricting part 363 is disposed above a portion that is slightly rearward of the center portion of the blade 31 supported by the main body 32 (see FIG. 5). A distance in the up-down direction between a lower surface of the front restricting part 363 and the support surface 331 is set to be slightly larger than the thickness of the blade 31. In the present embodiment, this distance is slightly larger than the distance in the up-down direction between the restricting surface 362 of the rear restricting part 361 and the support surface 331. The reason of this setting is to facilitate positioning of the blade 31 relative to the main body 32 in a process of assembling the driver 3, as will be described below. The lower surface of the front restricting part 363 also serves as a restricting surface 364 that contacts the upper surface of the blade 31 and restricts the upward movement of the blade 31.

The support part 33 is provided with a beam-like connection part 337 that is disposed frontward of the front restricting part 363 and that connects end portions of the support part 33 located at the left and right sides of the cut. An upper surface of the connection part 337 is located below the support surface 331. The connection part 337 is provided for the purpose of reinforcing the portion with the cut.

The frictional engagement parts 37 are portions configured to frictionally engage with the flywheel 53. As shown in FIG. 3 and FIG. 7, in the present embodiment, the frictional engagement parts 37 protrude downward from the lower surface of the support part 33, and extend generally in the front-rear direction along the left and right end portions of the support part 33. As shown in FIG. 6 and FIG. 7, the arms 38 are portions that protrude leftward and rightward from the left and right ends, respectively, of the center portion in the front-rear direction of the main body 32 (specifically, the support part 33 and the frictional engagement part 37). As described above, the wires of the return mechanism 7 (see FIG. 1) are respectively connected to the arms 38. When the arms 38 are pulled rearward by the wires, the driver 3, which has driven the nail 101, is returned to the initial position.

As shown in FIG. 3 through FIG. 5, the press-fit pin 39 is a member for restricting the movement of the blade 31, which is supported by the main body 32, relative to the main body 32 in the front-rear direction (the longitudinal direction) to thereby prevent the blade 31 from being separated from the main body 32. The press-fit pin 39 in the present embodiment is a metal circular cylindrical member that is configured to be press-fitted into the press-fit hole 333. The press-fit pin 39 may be formed as, for example, a pin with projections on its one axial end portion or a spring pin.

A manner of coupling the blade 31, the main body 32, and the press-fit pin 39 (namely, a manner of assembling the driver 3) is now described.

In the present embodiment, as shown in FIG. 3 through FIG. 5, the blade 31 is positioned and supported by the main body 32, and the press-fit pin 39 is engaged with the main body 32 and the blade 31, so that the driver 3 is formed. A worker first holds the blade 31 at a position spaced away upward from the support surface 331 and then inserts the front end portion 311 of the blade 31 into a passage passing between the roller contact parts 34 in the left-right direction and between the front restricting part 363 and the connection part 337 in the up-down direction. Since the support surface 331, the front restricting part 363, and the connection part 337 are arranged as described above, at this time, the worker is able to insert the blade 31 easily into the passage in a state in which the front side of the blade 31 is directed obliquely downward. The worker moves the blade 31 forward to the position where the rear end portion 312 is located frontward of the rear restricting part 361, and then places the blade 31 on the support surface 331. At this time, the rear portion of the blade 31 is fitted between the restricting parts 335 in the left-right direction. The blade 31 is supported by the support part 33 in a state in which the lower surface 314 is in contact with the support surface 331. At this time, the engagement hole 315 of the blade 31 is located frontward of the press-fit hole 333 of the support part 33. As shown in FIG. 5, the worker slides the blade 31 rearward along the support surface 331 to a position (hereinafter referred to as a contact position) where the rear end surface 313 of the blade 31 contacts the receiving surface 351 of the receiving part 35.

Instead of the procedure described above, the worker may insert the rear end portion 312 of the blade 31 into the passage passing between the front restricting part 363 and the connection part 337 from the front side of the main body 32, and then linearly slide the blade 31 rearward in a state in which the lower surface 314 is in contact with the support surface 331, so that the blade 31 is placed at the contact position. However, in this procedure, it is necessary for the worker to insert the rear end portion 312 of the blade 31 between the restricting parts 335 from the front side. In this point of view, the procedure described above is easier.

When the blade 31 is placed at the contact position (see FIG. 5), the engagement hole 315 of the blade 31 overlaps with the press-fit hole 333 of the support part 33 in the up-down direction. The worker inserts the press-fit pin 39 into the engagement hole 315 from the upper side of the blade 31 and press-fits a lower portion of the press-fit pin 39 into the press-fit hole 333. Alternatively, the worker may press-fit the press-fit pin 39 into the press-fit hole 333 from the lower side of the main body 32 (the support part 33). In this manner, the press-fit pin 39 is fixed to the main body 32 (the support part 33). As described above, the length in the front-rear direction of the engagement hole 315 is set to be larger than the diameter of the press-fit pin 39. When the blade 31 is located at the contact position, an upper portion of the press-fit pin 39 is loosely engaged with the engagement hole 315. More specifically, the press-fit pin 39 is disposed in the engagement hole 315 with clearances at the front and at the rear thereof. On the other hand, the width in the left-right direction of the engagement hole 315 is generally the same as the diameter of the press-fit pin 39. Further, as described above, the rear portion of the blade 31 is located between the restricting parts 335 (the restricting surfaces 336). Therefore, the blade 31 is able to move forward relative to the main body 32 from the contact position to a position where the press-fit pin 39 contacts the rear end of the engagement hole 315 (namely, by a distance that corresponds to the clearance at the rear side of the press-fit pin 39) while the movement of the blade 31 in the left-right direction is substantially prevented.

Operations of the nailer 1 in the present embodiment is now described. As described above, in the nailer 1, when a user manually pulls the trigger 131 while the contact arm (not shown) supported by the nose part 12 is pressed against the workpiece 100, the driver-driving mechanism 5 is actuated. More specifically, the motor 2 is driven and the flywheel 53 is rotated, and further the pressing roller 57 is moved to the pressing position. Consequently, the driver 3 is pressed against the flywheel 53 and frictionally engages with the flywheel 53, so that the driver 3 receives the rotational energy of the flywheel 53 and moves forward along the driving line L toward the driving position. At this time, even if the blade 31 is located frontward of the contact position relative to the main body 32, the main body 32, which is frictionally engaged with the flywheel 53, moves forward relative to the blade 31, so that the blade 31 is placed at the contact position. The main body 32 and the blade 31 located at the contact position integrally move frontward.

The driver 3 strikes the nail 101 in the driver passage and ejects the nail 101 from the ejection port 123, and drives the nail 101 into the workpiece 100 when the driver 3 reaches the driving position (see FIG. 2). At this time, a reaction force is applied to the driver 3, due to the driving of the nail 101. In the present embodiment, a rearward reaction force is applied to the blade 31 that strikes and drives the nail 101, and the receiving surface 351 of the receiving part 35 of the main body 32 contacts the rear end surface 313 of the blade 31 and receives this reaction force. As described above, when the blade 31 is located at the contact position, the clearances exist at the front side and the rear side of the press-fit pin 39, which is loosely engaged with the engagement hole 315, and therefore the press-fit pin 39 is not in contact with the blade 31 in the front-rear direction. With such a configuration, the impact that is transmitted to the press-fit pin 39 upon the driving can be reduced.

The blade 31 is apt to move upward from the support surface 331 of the main body 32 due to the impact upon the driving. However, when the blade 31 tries to move upward relative to the main body 32, the two restricting parts 36 (the restricting surfaces 362 and 364) contact the blade 31 from above to thereby restrict the further upward movement of the blade 31. In the present embodiment, the restricting surface 364 of the front restricting part 363 is inclined upward to the front side, and therefore the restricting surface 364 allows the front end portion 311 of the blade 31 to move slightly upward so that the impact is effectively released. Further, the movement of the blade 31 relative to the main body 32 in the left-right direction is restricted by the press-fit pin 39 and the restricting parts 335 (the restricting surfaces 336).

When the driver 3 reaches the driving position, the return mechanism 7 is actuated to return the driver 3 to the initial position at the rear side. At this time, the main body 32 connected to the return mechanism 7 is moved rearward relative to the blade 31, and the driver 3 is moved rearward in a state in which the press-fit pin 39 contacts the rear end of the engagement hole 315. However, in the return process, the impact like that in the driving process is not caused, and therefore a load applied to the press-fit pin 39 is relatively small.

As described above, the driver 3 of the nailer 1 in the present embodiment is not formed as one single piece member but include the blade 31, the main body 32, and the press-fit pin 39 that have been separately (discretely) formed. Since the driver 3 is thus formed by separate (discrete) components (members) coupled with each other, each of the main body 32 and the blade 31 can be formed independently of the other, using a suitable material and/or a suitable method. In particular, in the present embodiment, the blade 31 has a function of striking the nail 101, while the main body 32 has a function of receiving the rotational energy of the flywheel 53 by frictionally engaging with the flywheel 53. Thus, properties required for the blade 31 and the main body 32 are different from each other. Therefore, it is especially useful that the blade 31 and the main body 32 can be formed independently of each other.

The driver 3 in the present embodiment can be easily assembled by simply arranging the blade 31 between the support surface 331 of the main body 32 and the two restricting parts 36 in the up-down direction (the direction crossing the support surface 331) and engaging the press-fit pin 39 with the blade 31 and the main body 32 and thereby restricting the relative movement of the blade 31 and the main body 32 in the front-rear direction. In the present embodiment, the lower surface 314 of the blade 31 and the support surface 331 of the main body 32 are formed as flat surfaces that are parallel to the driving line L (the longitudinal axis of the driver 3). Therefore, the blade 31 can be particularly easily placed in the contact position while sliding the lower surface 314 on the support surface 331.

In this manner, in the present embodiment, the driver 3 is obtained that can be easily manufactured, regardless of the thickness of the front end portion 311 that strikes the nail 101.

When the driver 3 drives the nail 101, the rearward reaction force is applied to the blade 31, and the receiving surface 351 of the main body 32 receives this reaction force. Further, even if the blade 31 tries to move away from the support surface 331 due to the impact upon the driving, the two restricting parts 36 can restrict such movement. Thus, even though the driver 3 is formed by the blade 31 and the main body 32 that have been separately formed and that are coupled together, the driver 3 can appropriately perform the driving of the nail 101.

In the present embodiment, the rear restricting part 361 of the two restricting parts 36 is located at the position where the rear restricting part 361 faces the rear end portion 312 of the blade 31 at the upper side of the rear end portion 312. Such a configuration can reliably restrict the movement of the portion of the blade 31 that is farthest from the front end portion 311 that strikes the nail 101 in the direction away from the support surface 331. Further, since the press-fit pin 39 is located between the two restricting parts 36 in the front-rear direction, the movement of the blade 31 in the front-rear direction relative to the main body 32 and the movement of the blade 31 in the direction away from the support surface 331 can be stably restricted.

In the present embodiment, the receiving surface 351 is configured to contact the rear end surface 313 of the blade 31. Thus, structures of the rear end portion 312 of the blade 31, the receiving surface 351 of the main body 32 and adjacent portions thereof (the receiving part 35) can be simplified. Consequently, the manufacturing cost can be suppressed. By continuously forming the receiving part 35 and one of the restricting parts 36 like in the present embodiment, a particularly simple and reasonable structure can be obtained.

In the present embodiment, the press-fit pin 39 is fixed to the main body 32, and the upper portion of the press-fit pin 39 is disposed in the engagement hole 315 formed in the blade 31 in a state in which the clearances are provided at the front side and at the rear side of the press-fit pin 39. With such a configuration, the impact that is transmitted to the press-fit pin 39 upon the driving of the nail 101 can be reduced. Thus, according to the present embodiment, the press-fit pin 39 having a simple structure can restrict the relative movement of the blade 31 and the main body 32 in the front-rear direction. Consequently, the manufacturing cost can be suppressed. Further, in the present embodiment, the press-fit pin 39, which is fixed to the support part 33 so as to extend in the up-down direction orthogonal to the support surface 331, is inserted into the engagement hole 315 of the blade 31. According to such a coupling structure, the thickness in the up-down direction of each of the support part 33 and the blade 31 can be made relatively small. Further, in the present embodiment, the width in the left-right direction of the engagement hole 315 is generally the same as that of the press-fit pin 39. With this configuration, the press-fit pin 39 can also exhibit a function of restricting the movement of the blade 31 relative to the main body 32 in the left-right direction.

Second Embodiment

A nailer 1 according to a second embodiment will be described with reference to FIG. 8 through FIG. 12. The nailer 1 in the present embodiment includes a driver 4 having a structure that is different from that of the driver 3 in the first embodiment. The structures of the nailer 1 other than the driver 4 are the same as those in the first embodiment. Further, the most part of the driver 4 is the same as that of the driver 3. Therefore, in the following description, the same reference numerals are assigned to the same structures as those in the first embodiment, and the description thereof will be simplified or omitted. The structures different from those in the first embodiment will be mainly described.

Figure 8:
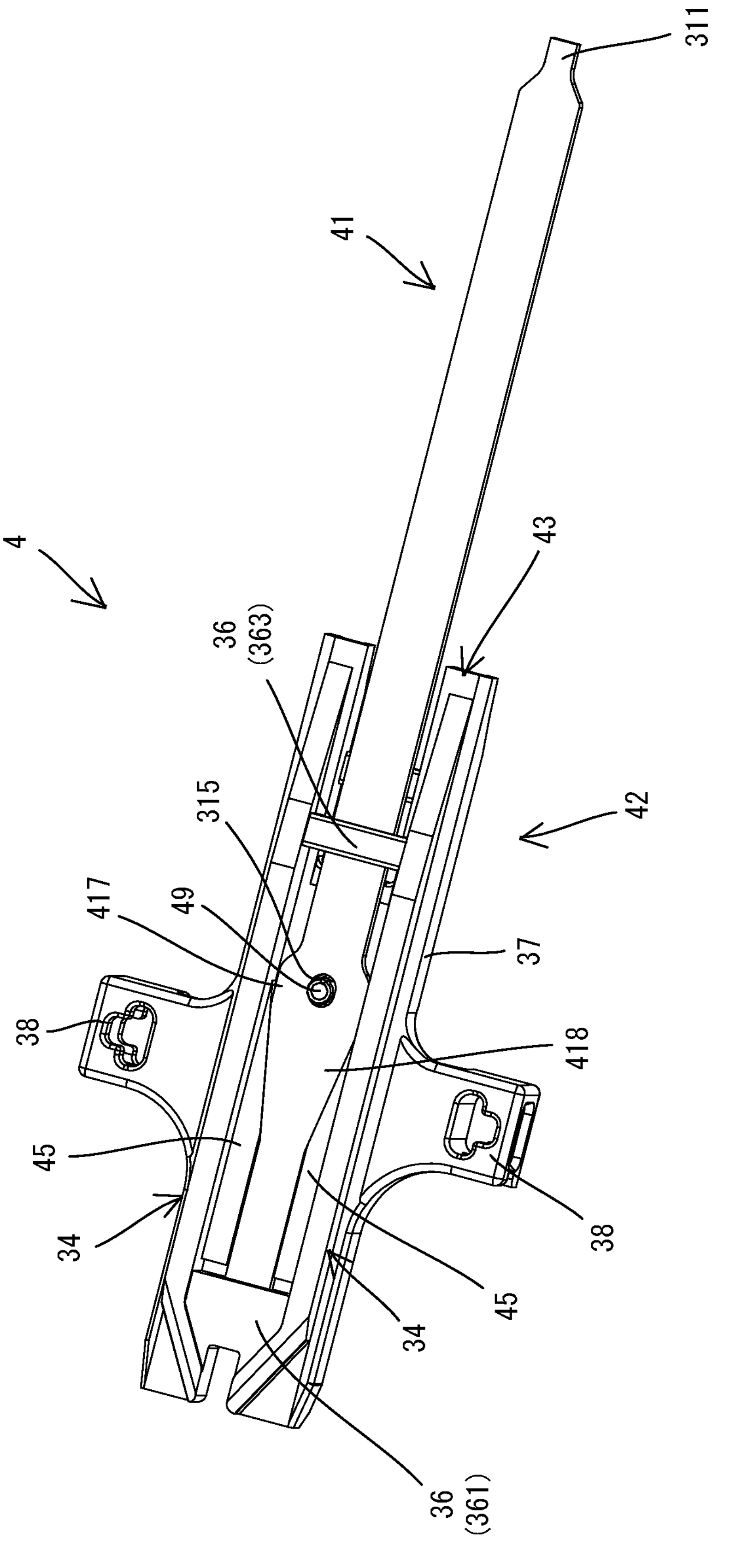
FIG. 8 is a perspective view of a driver according to another embodiment.
Figure 9:
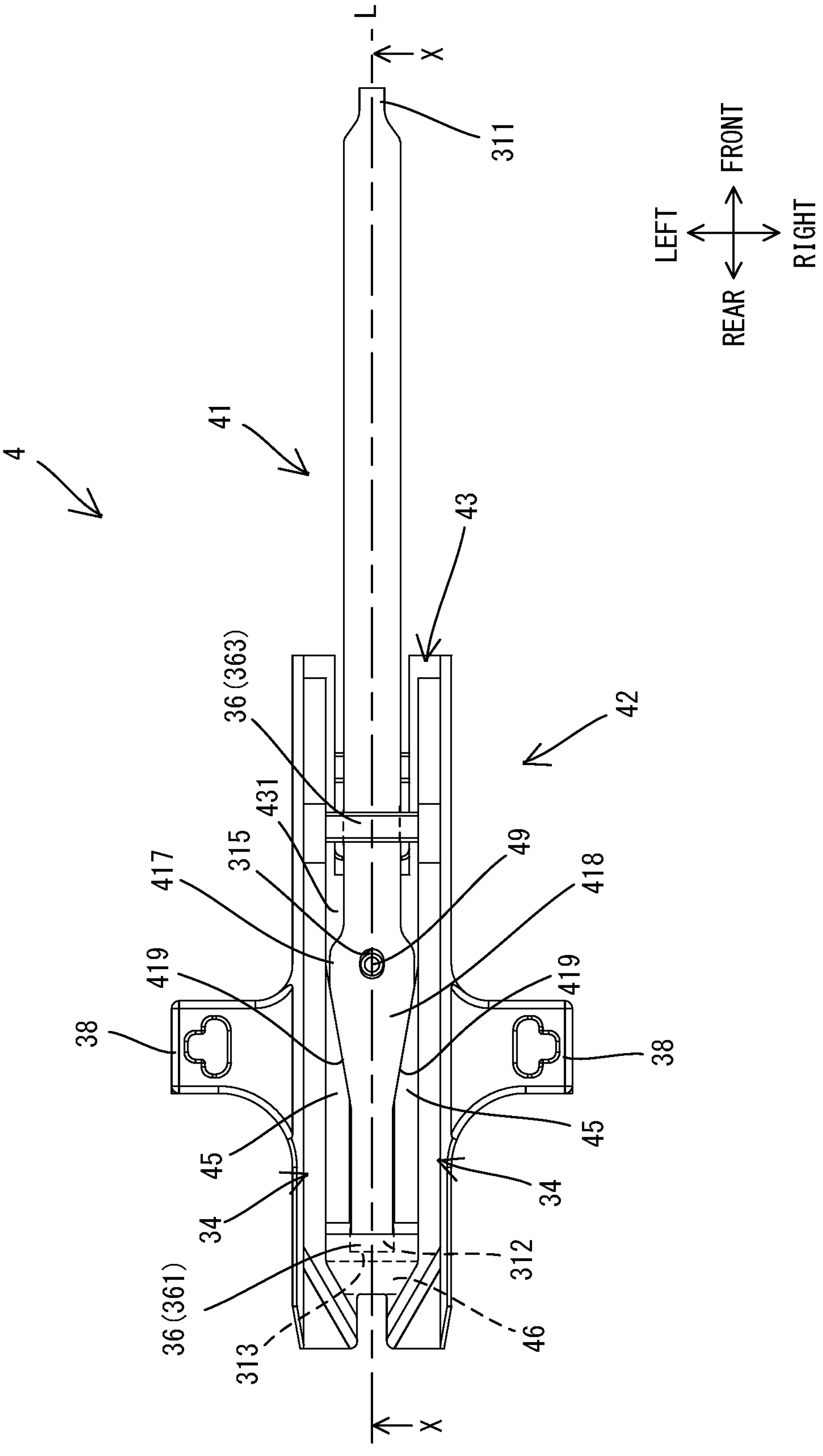
FIG. 9 is a plan view of the driver.
Figure 10:
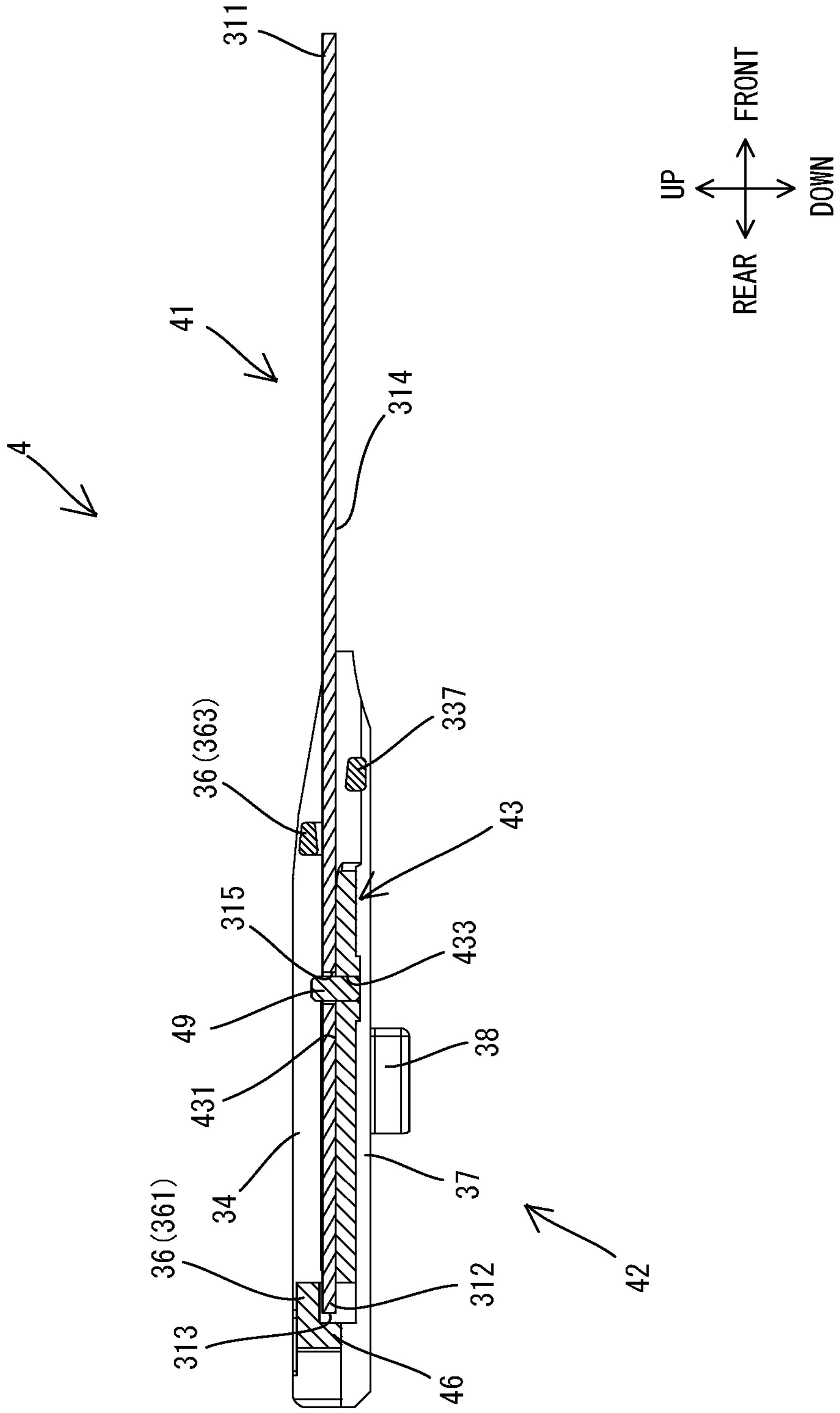
FIG. 10 is a cross-sectional view taken along line X-X in FIG. 9.

As shown in FIG. 8 through FIG. 10, similar to the driver 3 in the first embodiment, the driver 4 in the present embodiment is formed by a blade 41, a main body 42, and a screw member 49 that have been separately (discretely) formed and that are coupled with each other.

Similar to the blade 31 (see FIG. 4 and FIG. 5) in the first embodiment, the blade 41 is an elongate member having a rectangular thin plate shape extending in the front-rear direction. The blade 41 includes a front end portion 311, a rear end portion 312, and an engagement hole 315. A distance in the front-rear direction between the engagement hole 315 and the rear end portion 312 of the blade 41 is set to be slightly smaller than a distance in the front-rear direction between the engagement hole 315 and the rear end portion 312 of the blade 31. Further, in the present embodiment, the most part of the blade 41 has a uniform width (a length in the left-right direction), while a portion around the engagement hole 315 is formed as a wider part 417 that has a width larger than other part. The width of the wider part 417 in the left-right direction is set to be slightly smaller than an interval between the roller contact parts 34 of the main body 42. Further, an inclined part 418 extends rearward from the wider part 417. The inclined part 418 has a width that becomes smaller toward the rear when seen from above. Specifically, left and right side surfaces of the inclined part 418 are formed as inclined surfaces 419 that are inclined to be closer to each other (directed to the center line in the left-right direction of the blade 31) toward the rear end portion 312.

Figure 11:
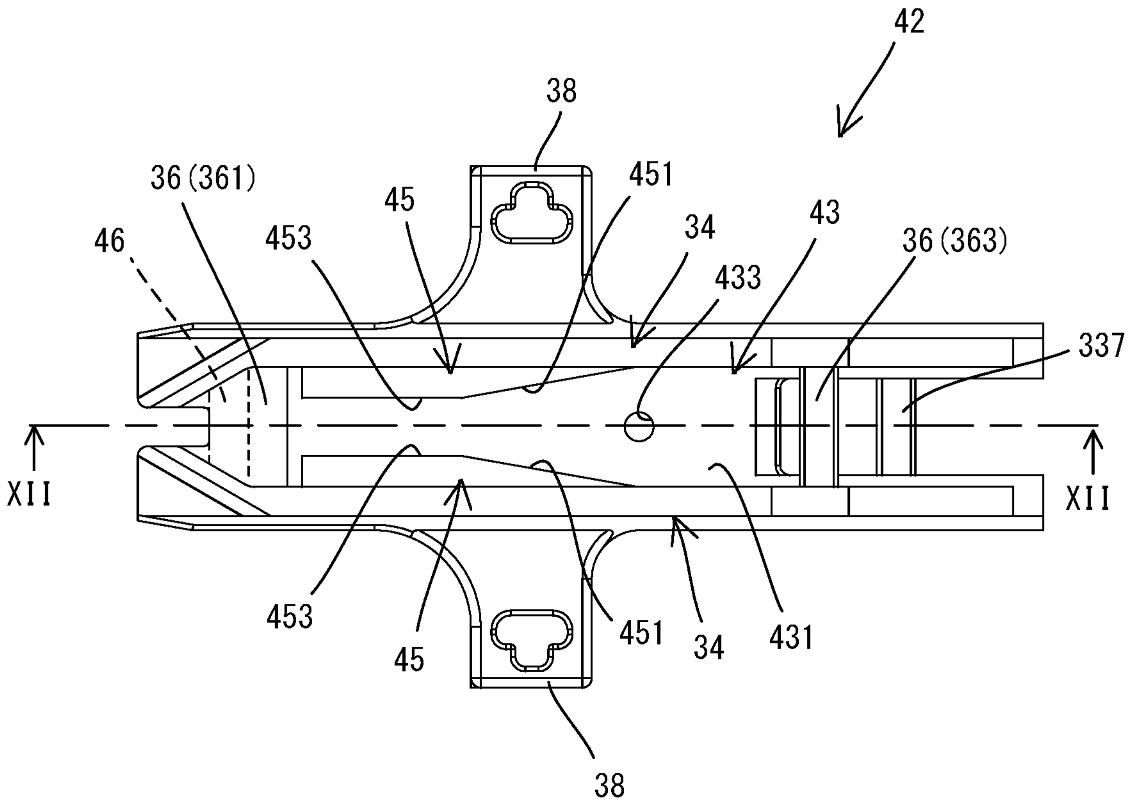
FIG. 11 is a plan view of a main body.
Figure 12:
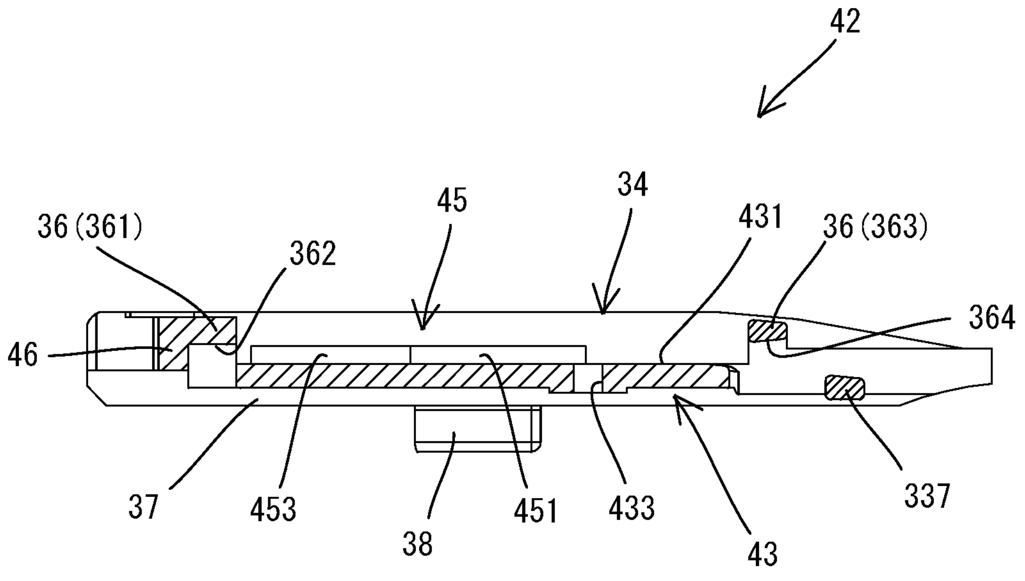
FIG. 12 is a cross-sectional view taken along line XII-XII in FIG. 11.

As shown in FIG. 11 and FIG. 12, similar to the main body 32 (see FIG. 6 and FIG. 7) in the first embodiment, the main body 42 is formed as a support member that supports the blade 41. The main body 42 includes a support part 43, the pair of roller contact parts 34, a pair of receiving parts 45, the two restricting parts 36 (the rear restricting part 361 and the front restricting part 363), the pair of frictional engagement parts 37, and the pair of arms 38. These parts are formed integrally, and therefor the main body 42 is a single metal member.

Similar to the support part 33 (see FIG. 6 and FIG. 7) in the first embodiment, the support part 43 is formed as a plate member that supports the blade 41 (specifically, the rear portion of the blade 41). The shape of the support part 43 when seen from above is generally the same as that of the support part 33. An upper surface of the support part 43 is formed as a support surface 431 that supports the blade 41. A screw hole 433 that extends through the support part 43 in the up-down direction is formed in the support part 43, instead of the press-fit hole 333.

In the present embodiment, the pair of receiving parts 45, which protrudes upward from the support surface 431, is provided, instead of the pair of restricting parts 335. The receiving parts 45 are disposed at positions spaced away from a center line in the left-right direction of the main body 42 (the longitudinal axis of the driver 3) by equal distances, so that the pair of receiving parts 45 has a left-right symmetrical shape. More specifically, when seen from above, a front half of each receiving part 45 has a width that gradually increases toward the rear such that one edge of the receiving part 45 comes closer to the center line in left-right direction of the main body 42 toward the rear, while a rear half of each receiving part 45 has a uniform width such that the edge extends parallel to the center line. Thus, opposing surfaces of the front halves of the receiving parts 45 are formed as inclined surfaces that are inclined to be closer to each other (directed to the center line in the left-right direction) toward the rear. Opposing surfaces of the rear halves of the receiving parts 45 are formed as parallel flat surfaces each extending in the up-down direction in parallel to the center line. The inclined surfaces of the front halves are matched with the inclined surfaces 419 of the blade 41 (see FIG. 9), and serve as receiving surfaces 451 that receive a reaction force by coming into contact with the inclined surfaces 419, respectively. Further, a distance between the parallel flat surfaces of the rear halves is set to be slightly larger than a width of a portion extending rearward of the inclined part 418 of the blade 41. The parallel flat surfaces of the rear halves serve as restricting surfaces 453 that restrict the movement of the blade 41 relative to the main body 42 in the left-right direction.

In the present embodiment, a rear wall part 46, which is identical to the receiving part 35 in the first embodiment (see FIG. 7), is disposed in the rear end portion of the main body 32, and the rear restricting part 361 is connected to the upper end portion of the rear wall part 46. As described above, a portion extending rearward of the engagement hole 315 of the blade 41 (see FIG. 9) is slightly shorter than that of the first embodiment, and therefore, as shown in FIG. 9 and FIG. 10, even when the blade 41 is arranged at a position (hereinafter referred to as a contact position) where the inclined surfaces 419 contact the receiving surfaces 451 of the receiving parts 45, the rear end surface 313 of the blade 41 does not contact the rear wall part 46.

The screw member 49 is configured to be threadedly engaged with the screw hole 433 of the support part 43. In the present embodiment, the screw member 49 is formed as a headless screw.

A manner of coupling the blade 41, the main body 42, and the screw member 49 in the present embodiment (namely, a manner of assembling the driver 4) is basically the same as the manner described in the first embodiment, and therefore the manner of coupling is briefly described.

A worker first holds the blade 41 at a position spaced above the support surface 431 and then inserts the front end portion 311 of the blade 41 into a passage passing between the front restricting part 363 and the connection part 337. The worker moves the blade 41 frontward to a position where the rear end portion 312 is located frontward of the rear restricting part 361, and places the blade 41 on the support surface 431. At this time, the rear portion of the blade 41 is located between the receiving parts 45. The worker then slides the blade 41 rearward along the support surface 431 to the contact position. Alternatively, the worker inserts the blade 41 into the passage from the front side of the main body 42 and moves the blade 41 rearward to the contact position. Unlike the first embodiment, in the present embodiment, since the interval between the front ends of the receiving parts 45 in the left-right direction is larger than the width of the rear end portion 312 of the blade 41, the blade 41 can be easily positioned relative to the main body 42 and supported by the main body 42 in this procedure.

As shown in FIG. 10, when the blade 41 is placed at the contact position, the engagement hole 315 of the blade 41 overlaps with the screw hole 433 of the support part 43 in the up-down direction. The worker inserts the screw member (the headless screw) 49 into the engagement hole 315 from the upper side of the blade 41 and screws a lower portion of the screw member 49 into the screw hole 433 of the support part 43. Alternatively, the worker screws the screw member 49 into the screw hole 433 from the lower side of the support part 43 such that an upper portion of the screw member 49 is inserted into the engagement hole 315. Similar to the first embodiment, when the blade 41 is placed at the contact position, the upper portion of the screw member 49 is disposed in the engagement hole 315 with clearances provided at the front and rear thereof. In a state in which the movement of the blade 41 in the left-right direction is substantially prevented by the screw member 49 and the receiving parts 45 (the restricting parts 453), the blade 41 is able to move forward relative to the main body 42 from the contact position to the position where the screw member 49 contacts the rear end of the engagement hole 315 (namely, by a distance that corresponds to the clearance at the rear side of the screw member 49).

When the driver 4 in the present embodiment drives the nail 101, the receiving surfaces 451 of the main body 42 contact the inclined surfaces 419 of the blade 41 and thereby receive the reaction force to the blade 41. Further, also in the present embodiment, when the blade 41 is located at the contact position, the clearances exist at the front side and the rear side of the screw member 49, which is loosely engaged with the engagement hole 315, and therefore the screw member 49 is not in contact with the blade 41. Therefore, the impact that is transmitted to the screw member 49 upon the driving can be reduced. The movement of the driver 4 to the initial position caused by the return mechanism 7 is similar to that described in the first embodiment.

As described above, the driver 4 in the present embodiment can also produce the effects described in the first embodiment by the structures that are identical to those of the driver 3. Thus, similar to the driver 3 in the first embodiment, the driver 4 has a structure that can be easily manufactured, regardless of the thickness of the front end portion 311 that strikes the nail 101, and the driver 4 can appropriately perform the driving of the nail 101.

In the present embodiment, the blade 41 has the inclined surfaces 419 that are inclined to be closer to each other toward the rear, and the main body 42 has the receiving surfaces (the inclined surfaces) 451 configured to respectively contact the inclined surfaces 419. Thus, relatively large areas can be secured for the blade 41 and the receiving surfaces 451 where they contact with each other, so that the surface pressure of the receiving surfaces 451 can be suppressed. Consequently, the durability of the main body 42 (the receiving part 45) can be favorably maintained. Since the receiving surfaces 451 are arranged in left-right symmetry, the receiving surfaces 451 receive the blade 31 with a stable posture.

Further, in the present embodiment, the screw member 49 is screwed into the main body 42 (the support part 43) to be detachably fixed to the main body 42, while the screw member 49 is loosely engaged with the engagement hole 315. In the driver 4, the blade 41 (the front end portion 311) that strikes the nail 101 may be more easily worn or deformed, compared to other portions of the driver 4. According to this embodiment, the blade 41 and the main body 42 can be decoupled by removing the screw member 49 from the main body 42, so that the blade 41 can be replaced.

The above-described embodiments are merely examples, and therefore the driving tool according to the present invention is not limited to the structures of the nailers 1 exemplarily described. For example, the following exemplary modifications may be adopted. One or more of these modifications can be adopted to be combined with any one of the nailers 1 in the embodiments and the feature(s) described in the claims.

The driving tool may be a tool that drives a fastener other than the nail 101. For example, the driving tool may be embodied as a tacker or a staple gun that drives a rivet, a pin, a staple or the like. The driving source of the flywheel 53 is not limited to the motor 2. For example, an AC motor may be adopted, instead of the brushless DC motor.

The driver-driving mechanism 5 and the return mechanism 7 may be modified as needed, as long as the driver-driving mechanism 5 and the return mechanism 7 are configured to move the driver 3, 4 forward and rearward, respectively. For example, the structure of the driver-driving mechanism 5 is not limited to the structure including the motor 2 and the flywheel 53 like in the above-described embodiments, as long as the driver-driving mechanism 5 is configured to move the driver 3, 4 from the initial position to the driving position. For example, the driver-driving mechanism 5 may be a mechanism formed by a motor, a plurality of gears and the like, or by a mechanism that is configured to reciprocate a piston disposed in a cylinder using the motor 2 to thereby move the driver 3, 4 by the action of an air spring. Further, instead of the mechanism that frictionally engages the driver 3, 4 directly with the flywheel 53 to transmit the rotational energy to the driver 3, 4, a mechanism may be adopted that transmits the rotational energy of the flywheel 53 to the driver 3, 4 via a transmission member. For example, a mechanism may be adopted in which a ring member, which serves as the transmission member, is disposed radially outward of the flywheel 53 to be frictionally engageable with both of the driver 3, 4 and the flywheel 53. Alternatively, a mechanism may be adopted that uses an intermediate roller. Further, the return mechanism 7 is configured to move the driver 3, 4 rearward using the elastic force of the torsion coil spring. Alternatively, for example, a structure that uses an elastic force of a compression coil spring or a tension coil spring may be adopted.

The structure of the driver 3, 4 may be modified, for example, as exemplarily described below.

In the above-described embodiments, the press-fit pin 39 or the screw member 49 that is fixed (press-fitted or screwed) to the main body 32 or 42 is loosely engaged with the engagement hole 315 formed in the blade 31 or 41. However, opposite to these examples, the press-fit pin 39 or the screw member 49 that is fixed (press-fitted or screwed) to the blade 31 or 41 may be loosely engaged with the engagement hole 315 formed in the main body 32 or 42. The engagement hole 315 may be formed as, not a through hole, but a bottomed hole. Clearances may be also formed at the left side and the right side of the press-fit pin 39 or the screw member 49. It may be preferable that the engagement hole 315 is formed such that the clearances are formed at the front side and the rear side of the press-fit pin 39 or the screw member 49 when the blade 31 or 41 is located at the contact position. However, the engagement hole 315 may be formed as a hole having a diameter that is generally the same as the diameter of the press-fit pin 39 or the screw member 49 (namely, a hole with substantially no clearance), as long as the receiving surface(s) 351 or 451 can almost completely receive the reaction force that is generated by the driving.

A plurality of the press-fit pins 39 or the screw members 49 and the engagement holes 315 in the above-described embodiments may be disposed at several positions spaced away from each other in the front-rear direction. In such a case, the plurality of press-fit pins 39 or the screw members 49 can restrict the movement of the blade 31 or 41 relative to the main body 32 or 42 in the left-right direction. Further, the pair of roller contact parts 34 may be used to restrict the movement of the blade 31 or 41 relative to the main body 32 or 42 in the left-right direction by setting a width of the wider part 317 or 417 of the blade 31 or 41 to be slightly smaller than an interval between the roller contact parts 34 in the left-right direction. In such a case, the restricting parts 335 and/or the rear half of the receiving part 45 may be omitted.

The support surface 331, 431 that supports the blade 31, 41 may not be a flat surface that is parallel to the driving line L (the longitudinal axis of the driver 3, 4). However, it may be preferable that an outer surface of the blade 31, 41 is slidable in the front-rear direction on the support surface 331, 431 because such a configuration facilitates the assembling of the blade 31, 41 to the main body 32, 42. For example, the lower surface 314 of the blade 31, 41 and the support surface 331, 431 may be formed as curved surfaces having an arc section and extending along the driving line L (the longitudinal axis of the driver 3, 4) (namely, not crossing the driving line L). Further, the dimension of the support surface 331, 431, the arranged position thereof on the main body 32, 42, and a portion of the blade 31 that is supported by the support surface 331, 431 may be modified as needed.

The number, the shapes and the positions of the restricting parts 36 may be modified as needed. For example, three or more of the restricting parts 36 may be provided. In order to stably support the blade 31, 41 and restricting the movement of the blade 31, 41, it may be preferable that two of the restricting parts 36 are disposed in the front portion and the rear portion of the main body 32, 42, and at least a portion of the support surface 331, 431 is disposed between the two restricting parts 36 in the front-rear direction.

The length, the thickness, and the width of the blade 31, 41, the shape of the front end portion 311 and the like may be modified as needed, depending on a fastener. Further, the structures of the roller contact parts 34, the frictional engagement parts 37, and the arms 38 of the main body 32 may be modified as needed, depending on the structures of the driver-driving mechanism 5 to be adopted.

The correspondences between the structural elements of the above-described embodiments and the modifications thereof and the structural elements of the present invention are as follows. The nailer 1 is an example of "a driving tool". The driving line L is an example of "a driving line". Each of the drivers 3 and 4 is an example of "a driver". Each of the blades 31 and 41 is an example of "a striking member". The front end portion 311, the rear end portion 312, and the rear end surface 313 are examples of "a front end portion", "a rear end portion", and "a rear end surface", respectively. Each of the main bodies 32 and 42 is an example of "a support member". Each of the press-fit pin 39 and the screw member 49 is an example of "an engagement member". Each of the support surfaces 331 and 431 is an example of "a support surface". Each of the receiving surface 351 and the pair of receiving surfaces 451 is an example of "at least one receiving surface". The restricting parts 36 (the rear restricting part 361 and the front restricting part 363) are an example of "a plurality of restricting parts". The pair of inclined surfaces 419 of the blade 41 is an example of "a pair of inclined surfaces (of the striking member)". The pair of receiving surfaces 451 of the main body 42 is an example of "a pair of inclined surfaces (of the support member)". The engagement hole 315 is an example of "a hole". The motor 2 and the flywheel 53 are examples of "a motor" and "a flywheel", respectively.

The following structures (aspects) may be provided in consideration of the present invention and the above-described embodiments. One or more of the following structures can be adopted to be combined with any one of the nailers 1 of the above-described embodiments, the modifications thereof, and the claimed invention.

(Aspect 1)

The engagement member is configured to extend in the crossing direction and to engage with the support member and the striking member.

(Aspect 2)

The engagement member is a screw or a pin.

(Aspect 3)

The striking member has a through hole that extends through the striking member in the crossing direction, and the engagement member is fixed to the support member so as to extend in the crossing direction and at least a portion of the engagement member is inserted into the through hole.

The engagement hole 315 is an example of "a through hole" in this aspect.

(Aspect 4)

The restricting parts are formed integrally with the support member as portions of the support member.

(Aspect 5)

The driving tool further comprises a pressing roller configured to press the driver toward the flywheel in a process in which the driver moves forward, the support member has a pair of roller contact parts, each of the roller contact parts protruding in the crossing direction from the support surface and being configured to contact the pressing roller to receive pressing of the pressing roller, and the support surface is disposed between the roller contact parts.

The pressing roller 57 and the pair of roller contact parts 34 are examples of "a pressing roller" and "a pair of roller contact parts", respectively, in this aspect.

(Aspect 6)

The receiving surface extends in a direction crossing the driving line.

(Aspect 7)

The support member further includes another restricting part configured to restrict movement of the striking member relative to the support member in a direction crossing both of the front-rear direction and the crossing direction.

The pair of restricting parts 335 and the rear half of the receiving part 45 is an example of "the restricting part" in this aspect.

The invention claimed is:

1. A driving tool comprising:

a driver configured to linearly move forward along a driving line that defines a front-rear direction of the driving tool to thereby strike and drive a fastener into a workpiece, wherein:

the driver comprises:

a striking member formed as an elongate member extending in the front-rear direction and having a front end portion and a rear end portion, the front end portion being configured to strike the fastener;

a support member configured to support the striking member; and an engagement member engaged with the striking member and the support member and configured to restrict movement of the striking member relative to the support member in the front-rear direction;

the support member includes:

a support surface that supports a portion of the striking member;

at least one receiving surface configured to receive a reaction force to the striking member caused by driving of the fastener; and restricting parts spaced apart from each other in the front-rear direction, located at an opposite side of the striking member from the support surface in a crossing direction crossing the support surface, and configured to restrict movement of the striking member in a direction away from the support surface;

one of the striking member and the support member has a hole;

the engagement member is fixed to the other one of the striking member and the support member; and a portion of the engagement member is disposed in the hole in a state in which a clearance is provided in the front-rear direction of the engagement member.

2. The driving tool according to claim 1, wherein one of the restricting parts is disposed at a position where the one of the restricting parts faces the rear end portion of the striking member in the crossing direction.

3. The driving tool according to claim 1, wherein the at least one receiving surface is configured to contact a rear end surface of the striking member.

4. The driving tool according to claim 1, wherein:

the striking member has a pair of inclined surfaces inclined to be closer to each other toward a rear, and the at least one receiving surface includes a pair of inclined surfaces configured to contact the pair of inclined surfaces.

5. The driving tool according to claim 1, wherein the engagement member is located between the restricting parts in the front-rear direction.

6. The driving tool according to claim 1, wherein the engagement member is removably fixed to at least one of the striking member and the support member.

7. The driving tool according to claim 1, wherein the engagement member is configured to extend in the crossing direction and to engage with the support member and the striking member.

8. The driving tool according to claim 1, wherein the engagement member is a screw or a pin.

9. The driving tool according to claim 1, further comprising:

a motor; and a flywheel configured to be rotationally driven by the motor, wherein:

the driver is configured to move forward in response to receiving rotational energy of the flywheel, and the support member is a portion that is configured to receive the rotational energy.

10. A driving tool comprising:

a driver configured to linearly move forward along a driving line that defines a front-rear direction of the driving tool to thereby strike and drive a fastener into a workpiece, wherein:

the driver comprises:

a blade having a front end portion and a rear end portion, the front end portion being configured to strike the fastener;

a support configured to support the blade; and a screw or a pin engaged with the blade and the support; and the support includes:

a support surface that supports a portion of the blade;

at least one receiving surface extending in a direction crossing the driving line and configured to contact the blade; and restricting parts spaced apart from each other in the front-rear direction, located at an opposite side of the blade from the support surface in a crossing direction crossing the support surface, and configured to restrict movement of the blade in a direction away from the support surface;

one of the blade and the support has a hole;

the screw or the pin is fixed to the other one of the blade and the support; and a portion of the screw or the pin is disposed in the hole in a state in which a clearance is provided in the front-rear direction of the screw or the pin.

11. The driving tool according to claim 10, wherein one of the restricting parts is disposed at a position where the one of the restricting parts faces the rear end portion of the blade in the crossing direction.

12. The driving tool according to claim 10, wherein the at least one receiving surface is configured to contact a rear end surface of the blade.

13. The driving tool according to claim 10, wherein:

the blade has a pair of first inclined surfaces inclined to be closer to each other toward a rear, and the at least one receiving surface includes a pair of second inclined surfaces configured to contact the pair of first inclined surfaces.

14. The driving tool according to claim 10, wherein the screw or the pin is located between the restricting parts in the front-rear direction.

15. The driving tool according to claim 10, wherein the screw or the pin is removably fixed to at least one of the blade and the support.

* * * * *